(12) United States Patent
Doty, III et al.

(10) Patent No.: US 7,515,708 B1
(45) Date of Patent: Apr. 7, 2009

(54) PRIVACY CASE FOR TELEPHONES

(76) Inventors: Arthur F. Doty, III, 7789 Russell Creek Rd., Edisto, SC (US) 29438; Robert M. Turkewitz, 720 Wildwood Rd., Charleston, SC (US) 29412

( * ) Notice: Subject to any disclaimer, the term of this patent is extended or adjusted under 35 U.S.C. 154(b) by 882 days.

(21) Appl. No.: 10/767,643

(22) Filed: Jan. 29, 2004

(51) Int. Cl.
*H04M 1/00* (2006.01)
*H04M 9/00* (2006.01)

(52) U.S. Cl. .................. 379/440; 379/451; 379/433.11

(58) Field of Classification Search ............ 379/428.01, 379/433.11, 440, 446, 451–452, 453, 433.01, 379/434, 433.12, 441, 450, 437, 439; 455/90.3, 455/347, 575.3, 575.8; D14/250, 143, 240, D14/243, 249, 251; 2/195.4
See application file for complete search history.

(56) References Cited

U.S. PATENT DOCUMENTS

| | | | |
|---|---|---|---|
| 5,095,385 A | | 3/1992 | Stroll, Jr. |
| 5,301,230 A | | 4/1994 | Barry |
| 5,353,349 A | | 10/1994 | Brown |
| 5,564,486 A | | 10/1996 | Deigman |
| 5,610,979 A | * | 3/1997 | Yu .............................. 379/455 |
| 5,778,062 A | * | 7/1998 | Vanmoor ................ 379/433.11 |
| 5,877,896 A | | 3/1999 | Gremban |
| 6,182,878 B1 | * | 2/2001 | Racca ......................... 224/605 |
| D448,368 S | | 9/2001 | Bettag et al. |
| 6,315,182 B1 | | 11/2001 | Chen |
| 6,510,311 B1 | | 1/2003 | Stitt |
| 6,772,879 B1 | * | 8/2004 | Domotor ................. 206/45.23 |
| 2002/0175099 A1 | * | 11/2002 | Wu ............................. 206/320 |
| 2007/0060224 A1 | * | 3/2007 | Liu ........................... 455/575.8 |

FOREIGN PATENT DOCUMENTS

JP            08154119 A   *   6/1996

* cited by examiner

*Primary Examiner*—Curtis Kuntz
*Assistant Examiner*—Phylesha Dabney
(74) *Attorney, Agent, or Firm*—Townsend M. Belser, Jr.; Nexsen Pruet, LLC (57) ABSTRACT

A phone case having a bottom wall, opposing side walls, and mouth and ear end walls that form a pocket with an opening having a rim for extending from ear to mouth and around the mouth to hide it from view and to muffle and block beyond the case words spoken into a phone nested therein. A sidewall portion of the rim may have a curved shape conforming generally to the contour of a human face from ear to mouth, and the pocket walls may be made of a flexible, sound absorbing material so that the rim of the opening is sufficiently deformable to conform substantially to the ear to mouth contour and form a sound seal when pressed against a human face. The ear end wall may form an ear portion of the rim for placement over an ear lobe to reduce interfering external noise.

29 Claims, 7 Drawing Sheets

PRIVACY CASE FOR TELEPHONES

TECHNICAL FIELD

The present invention relates generally to the field of telephone containers or cases, and more particularly to cases with privacy features for cellular and cordless phones and for phones with a receiver connected to a separate base by a cord, i.e., corded phones.

BACKGROUND OF THE INVENTION

It has become common practice for phones of all kinds, particularly cell phones, to be used in public places, such as restaurants, bars, parks, trains, and transportation terminals such as train stations and airport terminals. Phone users in public places often speak louder than usual in order to be heard by the call recipient and, whether speaking in a normal voice or louder, may be easily overheard by other persons within a relatively large radius that may be fifteen feet or greater. In addition, the mouth movement of the user is often visible to others who may be capable of reading lips. This often makes the phone user uncomfortable and often compromises privacy making the user unwilling to discuss private matters in a phone conversation in a public place, and many people near a phone user in a public place are disturbed by overhearing his or her telephone voice. Moreover, background noise may often interfere with voice and sound clarity. Therefore, there is a need for a device capable of covering a phone user's mouth and of muffling and/or blocking his or her voice beyond the case sufficiently to the make a phone conversation unintelligible to another person within a few feet of the device, even if the user is speaking louder than normal.

SUMMARY OF THE INVENTION

The present invention provides a phone case that, when in its position of use, is capable of covering a phone user's mouth and of muffling and/or blocking his or her voice beyond the case sufficiently to the make a phone conversation unintelligible to other persons in the vicinity, at least when the user is speaking in a normal voice. For purposes of this disclosure, "in the vicinity" of the user does not include persons in the presence of the user, i.e., persons with or otherwise very close to the user, but starts after a short distance of about five feet, preferably about four feet, and more preferably about three feet from the user.

For purposes of this disclosure and the claims set forth below, the term "phone body" encompasses both the foldable (hinged) and the rigid bodies of cell phones, the rigid bodies of cordless hard line phones and the separate receivers of corded hard line phones, all of which can use the cases and privacy features of the present invention. Although also useful for cordless and corded phones, the case of the invention is particularly useful as a carrying case for cellular phones having when in use a face with a microphone near one end and a speaker near the opposite end of the phone body, which may be of the rigid type or the foldable "flip-top" type. The carrying case comprises a pocket having a bottom wall, opposing sidewalls, and mouth and ear end walls connected to the bottom wall at opposite ends thereof.

The sidewalls of the case extend along corresponding sides of the phone body to beyond the opposite ends thereof. The mouth end wall and the ear end wall are connected to the sidewalls beyond the respective ends of the phone body in its nested position for use, which is the open position for foldable cell phones having a flip-top closable against a base. However, these end walls may include portions of the case beyond the ends of the nested phone that are in line with the sidewalls, particularly if the end walls have rounded corners or are rounded without corners to conform to the shape of an ear or mouth, or if the end walls do not have corners but comprises a fold line to facilitate collapsing and/or folding up the case when it is not in use. Therefore, for purposes of this disclosure and the claims below, the sidewalls are considered to end just beyond the corresponding ends of the position to be occupied by the phone body to be nested in the case, and the portions of the case beyond this point are considered to be part of the corresponding end wall.

The side and end walls also extend away from the bottom wall so that their distal edges form a pocket opening with a rim that is beyond an exposed phone face and extends from an ear to a mouth and around the mouth such that the mouth is hidden from view and words spoken in a normal voice by a user of the phone are received by the microphone while being muffled and/or blocked beyond the case sufficiently to be substantially unintelligible to persons in the vicinity of the user. Although the rim may be relatively straight from ear to mouth, the height of the sidewalls and mouth end wall preferably vary so that this portion of the rim has an inwardly curved shape conforming generally to the contour of a human face from ear to mouth.

The side and end walls of the case are preferably made of a flexible, sound absorbing material so that the rim of the opening is sufficiently deformable to conform substantially to the ear to mouth contour and form a substantial sound seal when pressed against a variety of human faces. The ear end wall preferably extends from the bottom wall to beyond the exposed phone face to form an ear portion along the rim of the case opening that extends around the ear and is adapted to be placed over and/or behind an ear lobe to reduce external noise that would otherwise interfere with the voice and/or sound clarity of phone user's hearing of words emitted by the phone's speaker and of the recipient's hearing of words spoken into the microphone. Preferably, the rim is substantially continuous around the pocket opening.

An elastic or hook and loop strap, or an open mesh net, may extend between the edges of the bottom wall or between the sidewalls as a means for retaining the phone body in the main pocket with the microphone end adjacent to the mouth end wall and the speaker end adjacent to the ear end wall. The open mesh net preferably cooperates with the bottom wall and/or sidewalls to form an auxiliary interior pocket for receiving a part of the phone body with an entrance opening facing either toward the upper or lower end of the case, and this opening may be surrounded by an elastic band for gripping an intermediate portion of the phone body, such as a mid-portion adjacent to the keypad of a cellular or cordless phone.

The strap retaining means is preferably connected at its opposite ends to opposite edges of the bottom wall or to the side walls and arranged to pass over and engage an intermediate portion of the phone face to hold the phone body in a secure position against an interior surface of the bottom wall. The strap may be a single band made of an elastic material or the strap may be made in two segments arranged to overlap and detachably engage each other. Various fastening means may be used for detachably engaging the overlapped segments, such as hook and loop fastening elements or male and female snap fastening elements. For a flip-top phone, the strap is preferably made of a single band of thin elastic material so as not to interfere with closure of the flip top against the base.

An upper portion of the case for cell phones is preferably foldable over a lower portion thereof to close the pocket opening for transporting a phone nested therein, and the case preferably includes means for facilitating the folding of the upper portion over the lower portion for this purpose. In one embodiment of the case made of a flexible material, the folding means comprises accordion-like pleats in each of the sidewalls. In another embodiment of the case made of a flexible material, the folding means comprises an inwardly projecting lip forming a portion of the contoured edge along each of the sidewalls. In the latter embodiment, the inwardly projecting lip preferably forms part of a continuous rim that extends substantially entirely around the perimeter of the pocket opening to provide a smooth surface for comfortably contacting the user's face and facilitating the substantial sound seal provided by this rim.

The foldable case preferably includes a flap or tab connected to the upper or lower case portion and means for detachably fastening the flap or tab to an exterior surface of the lower or upper case portion, respectively, to keep the opening closed by securing the upper and lower portion together in their folded condition. The fastening means is preferably a mechanical fastener, such as one comprising snap fastening elements or hook and loop fastening elements, one element of which is on an interior surface of the flap or tab and the other cooperating element of which is on an exterior surface of the case.

Where the walls of the case are made of a flexible material, the mouth end wall, the ear end wall, and the bottom wall may each comprise at least one fold line so that the case is collapsible along these fold lines from an open condition for receiving a phone body to a collapsed condition in which the opposing sidewalls may be brought into abutment upon removal of the phone body to produce a substantially flat and compact case structure for easy transport in a pocket or purse. In addition, one or more of these three walls may comprise at least three fold lines for forming at least one pleat in the corresponding wall when the case is being folded into its collapsed condition. The invention further contemplates that any of the cases described herein may be adapted for use with the receiver phone body of a corded phone by the addition of an aperture in any wall of the case through which a cord may pass to connect the receiver body to a base of the corded phone.

BRIEF DESCRIPTION OF THE DRAWINGS

The structure, operation and use of the invention may be further understood by reference to the detailed description below, taken in conjunction with the accompanying drawings in which:

FIG. 13 is a sectional view of the case of FIG. 11 similar to that of FIG. 12, but with the case opened to receive a phone;

FIG. 14 is a perspective side view of the collapsed case of FIG. 11 as subsequently folded into a more compact size for transport in a pocket or purse; and, FIG. 15 is a perspective side view illustrating a still further embodiment of a collapsible phone case according to the invention in its open condition for use with a rigid receiver as nested therein with a cord for its connection to the base of a corded phone.

DETAILED DESCRIPTION OF THE INVENTION

Figure 1:
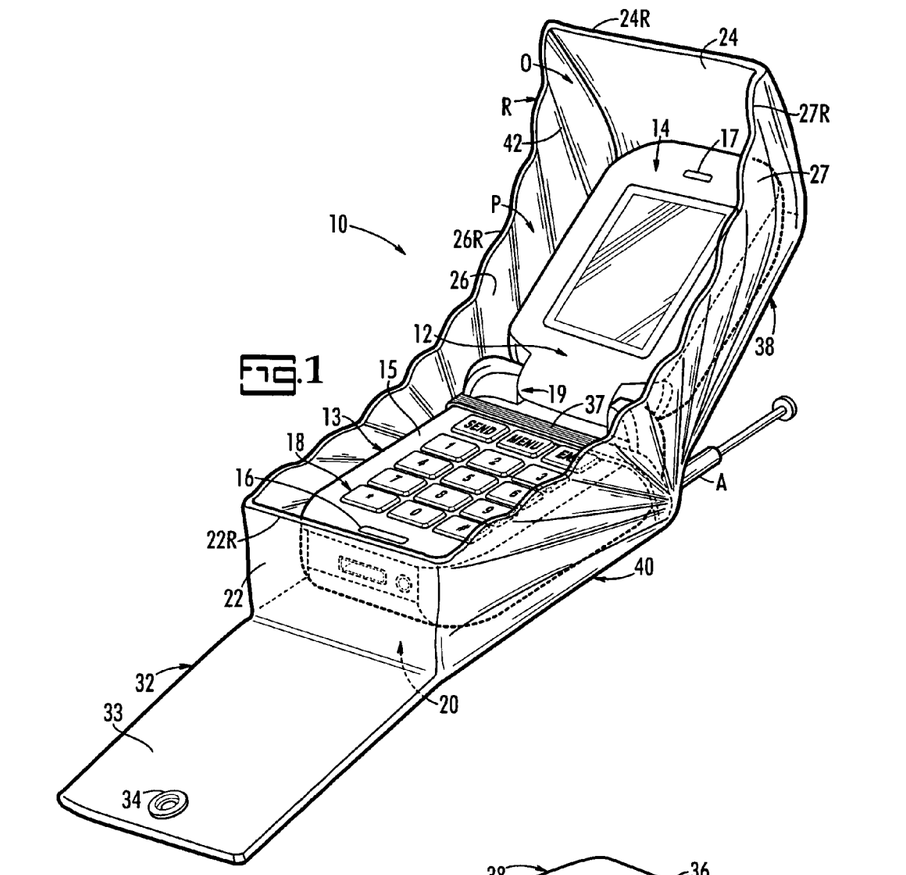
FIG. 1 is a perspective front view illustrating a phone carrying case according to the invention in its open condition for use with a flip-top cell phone as nested therein.
Figure 2A:
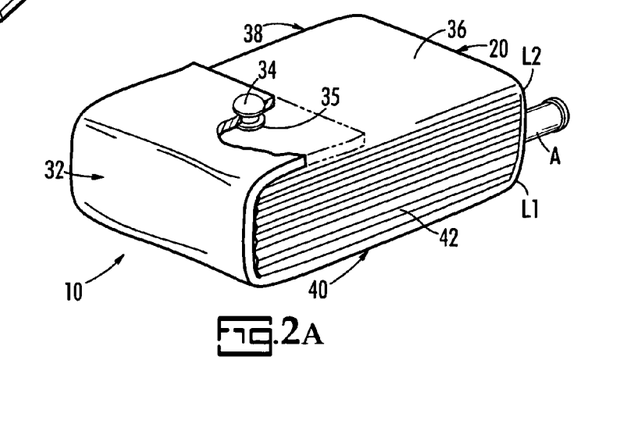
FIG. 2A is a perspective front view of the case of FIG. 1 in its closed condition for storage of the cell phone enclosed therein and includes a fragmentary sectional portion illustrating a snap closure fastener.
Figures 2B, 3, 4:
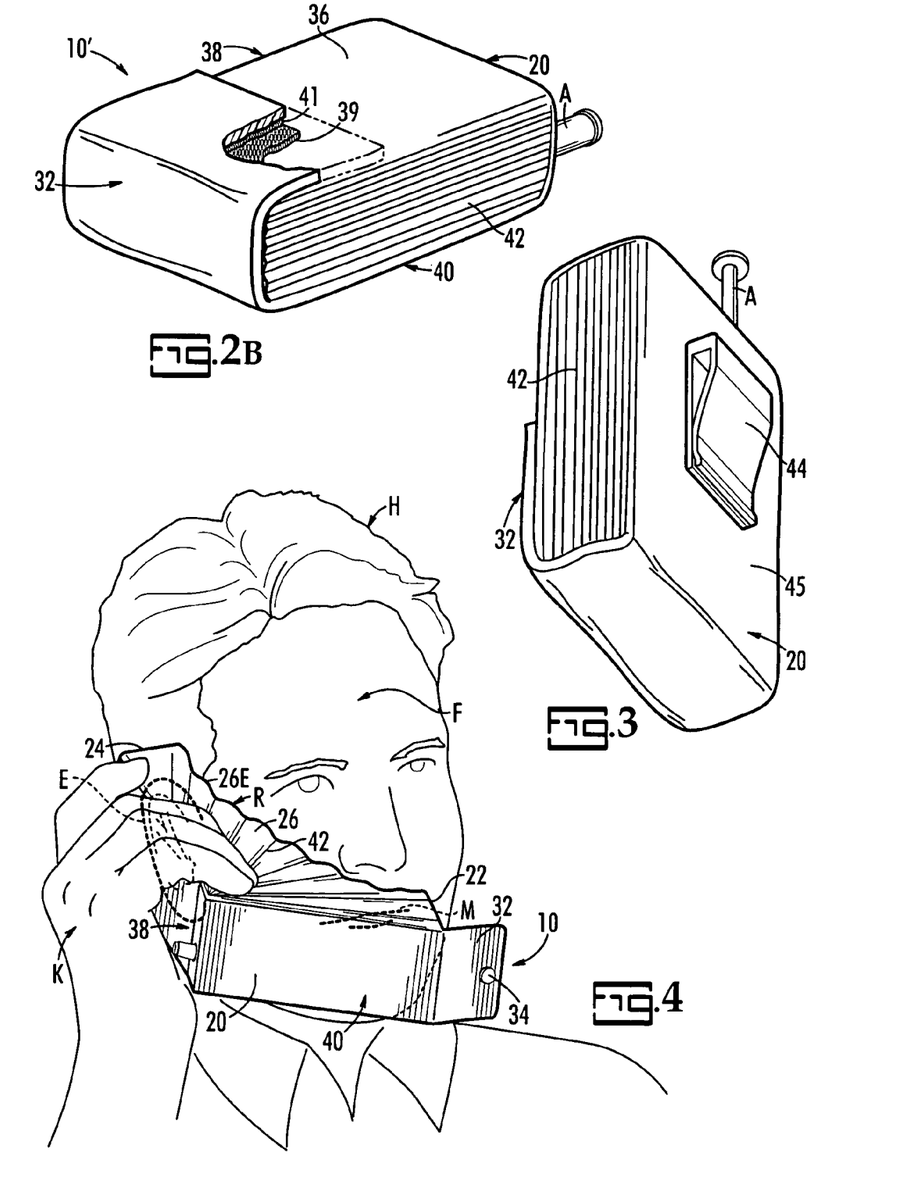
FIG. 2B is a perspective front view similar to FIG. 2A but with a fragmentary sectional portion illustrating a hook and loop closure fastener.
FIG. 3 is a perspective rear view of the case of FIG. 2A or 2B in its closed condition.
FIG. 4 is a perspective rear view of the head and shoulders of a man using the cell phone and case of FIG. 1.

As illustrated in FIG. 1, the invention provides a cell phone carrying case 10 that, when in its open position as shown, is capable of covering both the mouth M and the ear E of a cell phone user H as shown in FIG. 4. The structure of the case is such that the voice of the user is sufficiently muffled and/or blocked beyond the case to the make his or her cell phone conversation unintelligible to other persons in the vicinity, at least when the user is speaking in a normal voice. The structure of the case is also such that background noise is muffled and/or blocked from interfering with the user's hearing of the conversation.

The carrying case 10 is for use with a cellular phone, such as a flip-top phone 12 having an antenna A and a body comprised of a base 13 and a top 14 connected to the base by a hinge 19. When the phone 12 is readied for use by opening the top 14 as shown in FIG. 1, there is exposed a face 15 with a microphone 16 near one end and a speaker 17 near the opposite end of the phone body, and with a keypad 18 in between. The phone body here also may be of the rigid type shown in FIG. 5, this type merely requiring an upper extension of the case 10 and a fold line beyond the speaker end.

The carrying case 10 comprises a pocket P in which the phone is nested. The pocket P is formed by a bottom wall 20, upstanding sidewalls 26 and 27 on opposite sides of the bottom wall, and an upstanding mouth end wall 22 and an upstanding ear end wall 24 at opposite ends of the bottom wall, each of the upstanding walls being connected at its base to the bottom wall 20. The mouth end wall 22 and the ear end wall 24 are connected to the bottom and side walls beyond the respective ends of the phone body in its position for use, which is the open position for flip-top phones having a flip-top closable against a base.

The sidewalls 26 and 27 of the case 10 extend along corresponding sides of the phone body beyond the opposite ends thereof as shown in FIG. 1. These sidewalls and end walls 22 and 24 also extend away from the bottom wall 20 to form a pocket opening with an edge or rim R comprised of sidewall edges 26R and 27R and end wall edges 22R and 24R. When the phone is in use, the rim R is substantially beyond the phone face 15 and extends from ear E to mouth M and around the mouth M of a phone user H such that, when the case 10 is held by the user's hand K with the opening O toward the face F, the upper portion 38 opposite the ear, and the lower portion 40 opposite the mouth, the mouth is hidden from view and the walls of the case form a sound barrier as illustrated in FIG. 4. Thus, the structure of the pocket P and its opening O are such that words spoken in a normal voice by a user of the phone are received by the microphone while being muffled and/or blocked beyond the case sufficiently to be substantially unintelligible to persons in the vicinity of the user. To increase the effectiveness of this sound barrier, the edges 26R and 27R of opening O preferably vary in their height above bottom wall 20 to provide the rim R with a curved shape conforming generally to the contour of a human face F from the ear E to the mouth M as shown best in FIGS. 1 and 4.

The sidewalls 26 and 27 and the end walls 22 and 24 are preferably made of a flexible material so that the rim of the opening O is sufficiently deformable to conform substantially to the ear to mouth contour and form a substantial sound seal when pressed against a variety of human faces. In addition, the ear end wall 24 preferably also extends from the bottom wall 20 to beyond the phone face 15 to form an ear portion along the rim of the case opening O that is adapted to be placed over and/or behind the rear lobe of ear E to muffle and/or block external noise that would otherwise interfere with the phone user's hearing of words emitted by the phone's speaker 17. Thus, the rim R preferably is substantially continuous around the pocket opening O. A length of the case 10 in the range of about six to twelve inches, preferably about seven to ten inches, will usually be sufficient for an open case to extend both over the mouth and the ear. The width of the case is sufficient for the pocket P to receive the width of conventional phone bodies, which usually will require a case width in the range of one and a half to four inches.

A retaining strap 37 is provide intermediate the ends of the bottom wall 20 as a means for retaining the phone 12 in the pocket P with the microphone end adjacent the mouth end wall 22 and the speaker end adjacent the ear end wall 24. The strap 37 may be made of an elastic material as shown in FIG. 1, or may be in two segments with overlapping portions detachably connected by hook and loop fastening elements like the strap shown in FIG. 5 or by male and female snap elements similar to those shown in FIGS. 2A and 6. The strap 37 is connected at its opposite ends to opposite edges of the bottom wall 20 or to the respective sidewalls 26 and 27, and is arranged to pass over and engage an intermediate portion of the phone face 15 to hold the phone 12 in a secure position against an interior surface of the bottom wall 20. For the flip-top phone 12, the strap 37 is preferably made of a single piece of thin elastic material so as not to interfere with closure of the flip top 14 against the base 13.

The upper portion 38 of phone case 10 is preferably foldable over the lower portion 40 to close the pocket opening O, and the case 10 preferably includes means for facilitating the folding of the upper portion over the lower portion for this purpose. In the embodiment shown in FIGS. 1-4, the case 10 is made of a flexible, sound absorbing material and the folding means comprises accordion-like pleats 42 in each of the sidewalls 26 and 27, and preferably two transverse fold lines L1 and L2 positioned to be at corners of the folded case adjacent to the hinge 19 of the folded phone.

The foldable case 10 preferably includes a flap 32 connected to the bottom of the lower case portion 40 at end wall 22 and means for detachably fastening flap 32 to an exterior surface 36 of the upper case portion 38 to keep the opening O closed by securing the upper and lower portions together in their folded condition as shown in FIG. 2A. The fastening means is preferably a mechanical fastener, such as the female snap fastening element 34 and the male snap fastening element 35 on the case 10 of FIG. 2A, or the hook fastening element 39 and the loop fastening element 41 on case 10' of FIG. 2B, element 34 or 41 being shown on an interior surface 33 of the flap 32 and the other cooperating element 35 or 39 being shown on the exterior surface 36 of the upper case portion 38, although these positions are reversible (the same numerical designations being used for identical parts of cases 10 and 10'). As shown in FIG. 3 a clip 44 may be provided on a portion 45 of the exterior surface of the bottom wall 20 of either case 10 or case 10' for the purpose of clipping a stored phone on a belt or other apparel of the user for easy transport and accessibility.

Figures 5, 6:
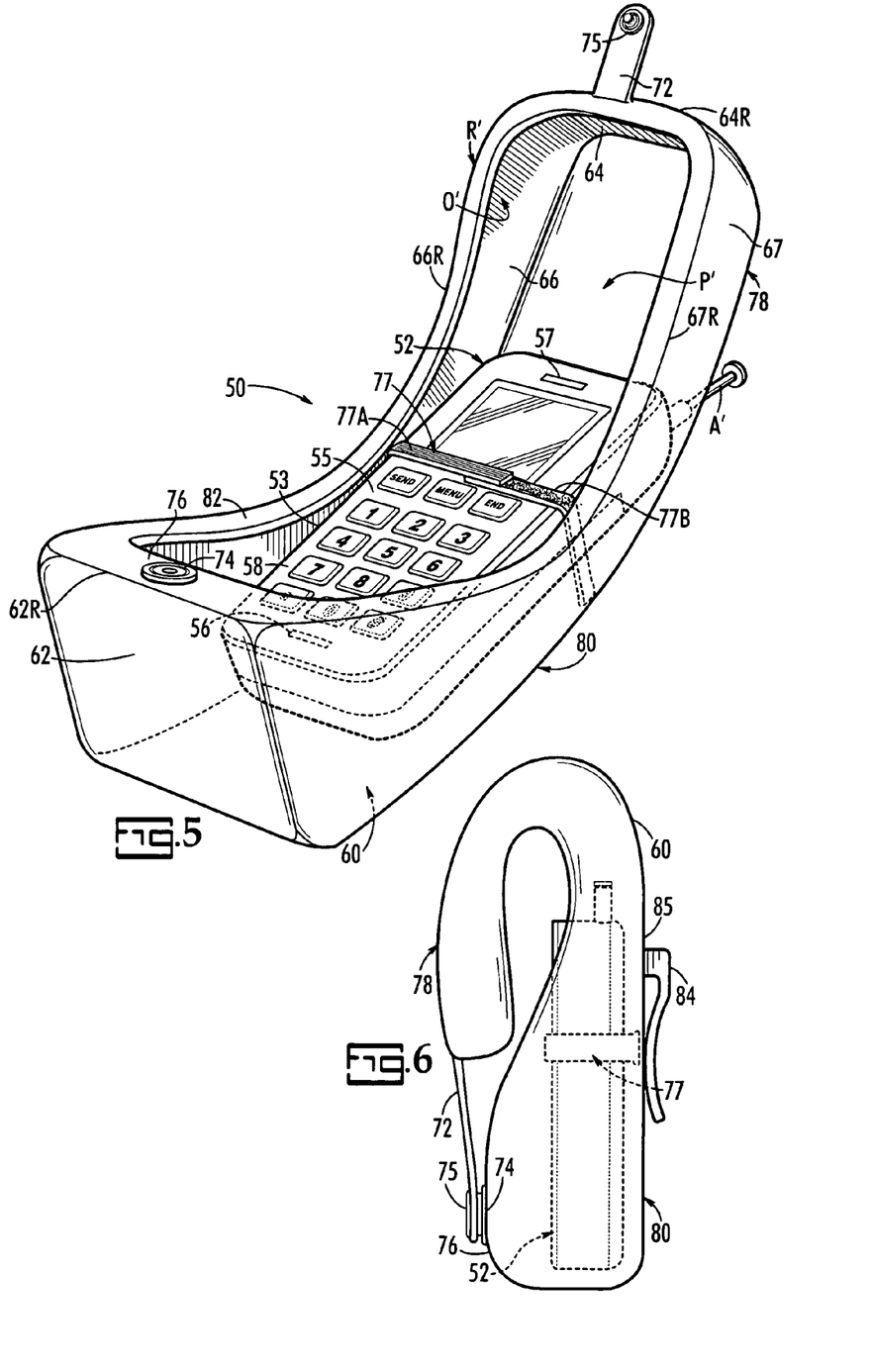
FIG. 5 is a perspective front view illustrating a further embodiment of a phone carrying case according to the invention in its open condition for use with a rigid cell phone as nested therein.
FIG. 6 is a side view of the phone case of FIG. 5 in its closed condition for storage of the cell phone enclosed therein.
Figures 7, 9:
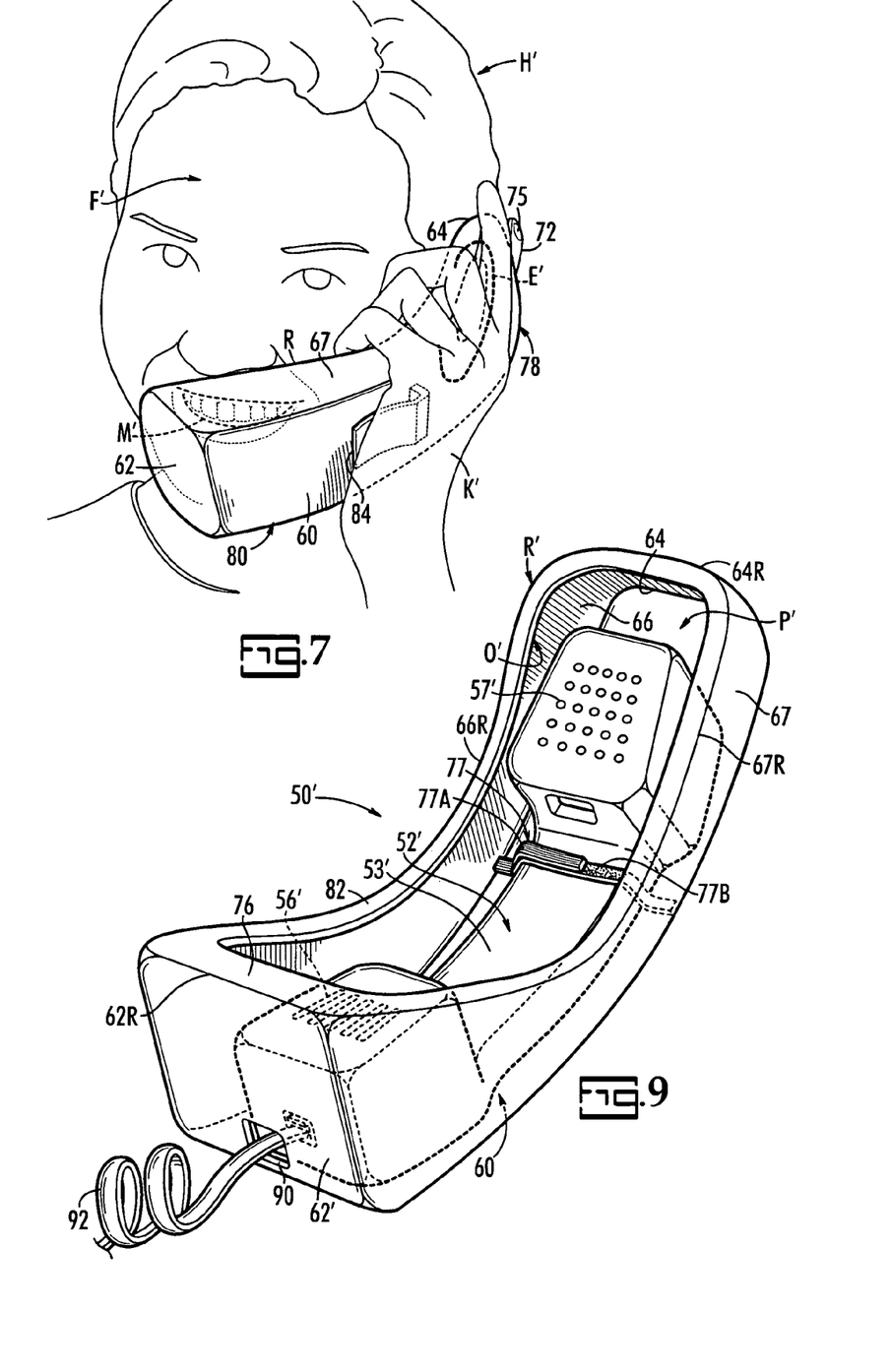
FIG. 7 is a perspective rear view of the head and shoulders of a man using the cell phone and case of FIG. 5.
FIG. 9 is a perspective front view illustrating yet another embodiment of a phone case according to the invention for use with a rigid receiver as nested therein with a cord for its connection to the base of a corded phone.

Referring now to FIGS. 5-7, there is shown as another embodiment a cell phone carrying case 50 that, when in its open position as shown in FIG. 5, is capable of covering both the mouth M' and the ear E' and forming a seal with the face F' of a cell phone user H' as shown in FIG. 7. The structure of this case is also such that the voice of the user is sufficiently muffled and/or blocked beyond the case to the make his or her cell phone conversation unintelligible to other persons in the vicinity, at least when the user is speaking in a normal voice.

The carrying case 50 comprises a pocket P' in which is nested a cellular phone 52 having a rigid body 53, an antenna A' and an exposed face 55 with a microphone 56 near one end and a speaker 57 near the opposite end of the phone body. Alternatively, the phone here may be of the flip-top type shown in FIG. 1, this type of phone merely permitting a shortening of the case 50 and a fold line adjacent the hinge between flip-top and base. The rigid phone body 53 also may be that of a cordless phone, which has essentially the same components as mentioned above for the cellular phone 52.

The pocket P' is formed by a bottom wall 60, upstanding sidewalls 66 and 67 on opposite sides of the bottom wall, and an upstanding mouth end wall 62 and an upstanding ear end wall 64 at opposite ends of the bottom wall, each of the upstanding walls being connected at its base to the bottom wall 60. The mouth end wall 62 and the ear end wall 64 are connected to the bottom and side walls beyond the respective ends of the phone body in its position for use as shown in FIG. 5.

The sidewalls 66 and 67 of the case 50 extend along corresponding sides of the phone body beyond the opposite ends thereof as also shown in FIG. 5. These sidewalls and end walls 62 and 64 also extend away from the bottom wall 60 to form a pocket opening O' with a substantially continuous rim R' comprised of sidewall edges 66R and 67R and end wall edges 62R and 64R. When the phone is in use, the rim R' is substantially beyond the phone face 55 and extends from ear E' to mouth M' and around the mouth M' of a phone user H' such that, when the case 50 is held by the user's hand K' with the opening O' toward the face F', the upper portion 78 opposite the ear, and the lower portion 80 opposite the mouth, the mouth is hidden from view and the walls of the case form a sound barrier.

Thus, the structure of the pocket P' and its opening O' are such that words spoken in a normal voice by a user of the phone are received by the microphone while being muffled and/or blocked beyond the case sufficiently to be substantially unintelligible to persons in the vicinity of the user. To increase the effectiveness of this sound barrier, the edges 66R and 67R of opening O' preferably vary in their height above bottom wall 60 to provide the rim R' with a curved shape conforming generally to the contour of a human face F' from the ear E' to the mouth M' as shown best in FIG. 7. A length of the case 50 in the range of about six to twelve inches, preferably about seven to ten inches, will usually be sufficient for an open case to extend both over the mouth and the ear. The width of the case is sufficient for the pocket to receive the width of conventional phone bodies, which usually will require a case width in the range of one and a half to four inches.

The sidewalls 66 and 67 and the end walls 62 and 64 are preferably made of a flexible, sound absorbing material so that the rim R' of the opening O' is sufficiently deformable to conform substantially to the ear to mouth contour and form a substantial sound seal when pressed against a variety of human faces. In addition, the ear end wall 64 preferably also extends from the bottom wall to beyond the phone face to form an ear portion along the rim of the case opening that is adapted to be placed over and/or behind the rear lobe of ear E' to muffle and/or block external noise that would otherwise interfere with the phone user's hearing of words emitted by the phone's speaker 57.

A retaining strap 77 is provided between the ends of the bottom wall 60 and the sidewalls 66 and 67 as a means for retaining the phone 52 in the pocket P' with the microphone end adjacent the mouth end wall 62 and the speaker end adjacent the ear end wall 64. The strap 77 may be made of an elastic material as shown in FIG. 1, or may be in two segments 77A and 77B with overlapping end portions detachably connected by hook and loop fastening elements as shown in FIG. 5. Alternatively, the end portions may be detachably connected by male and female snap elements similar to those shown in FIGS. 2A and 6. The strap 77 is connected at its opposite ends to opposite edges of the bottom wall 60 or to the respective sidewalls 66 and 67, and is arranged to pass over and engage an intermediate portion of the phone face 55 to hold the phone 52 in a secure position against an interior surface of the bottom wall 60.

The upper portion 78 of phone case 50 is preferably foldable over the lower portion 80 to close the pocket opening O', and the case 50 preferably includes means for facilitating the folding of the upper portion over the lower portion for this purpose. In this embodiment, the case is also made of a flexible material and the folding means comprises an inwardly projecting lip 82 forming a portion of each of the contoured edges 66R and 67R along the respective sidewalls 66 and 67. The inwardly projecting lip 82 preferably forms part of the substantially continuous rim R' extending entirely around the perimeter of the pocket opening O' to provide a smooth surface for comfortably contacting the user's face F' and facilitating the substantial sound seal provided by this rim.

The foldable case 50 preferably includes a tab 82 connected to the upper case portion 88 at the upper end wall 64 and means for detachably fastening this tab to an exterior surface of the lower case portion 80 to keep the opening O' closed by securing the upper and lower portions together in their folded condition as shown in FIG. 6. The fastening means is preferably a mechanical fastener, such as the female snap fastening element 74 and the male snap fastening element 75, element 75 being shown on an interior surface 73 of the tab 75 and cooperating element 74 being shown on the exterior surface 76 of the lower case portion 78, although these positions are reversible. Other fastening elements may be used instead, such as hook and loop fastening elements similar to those shown in FIG. 2B. As shown in FIG. 6 a clip 84 may be provided on a portion of the exterior surface of the bottom wall 60 for the purpose of clipping a stored phone on a belt or other apparel of the user for easy transport and accessibility.

Figure 8:
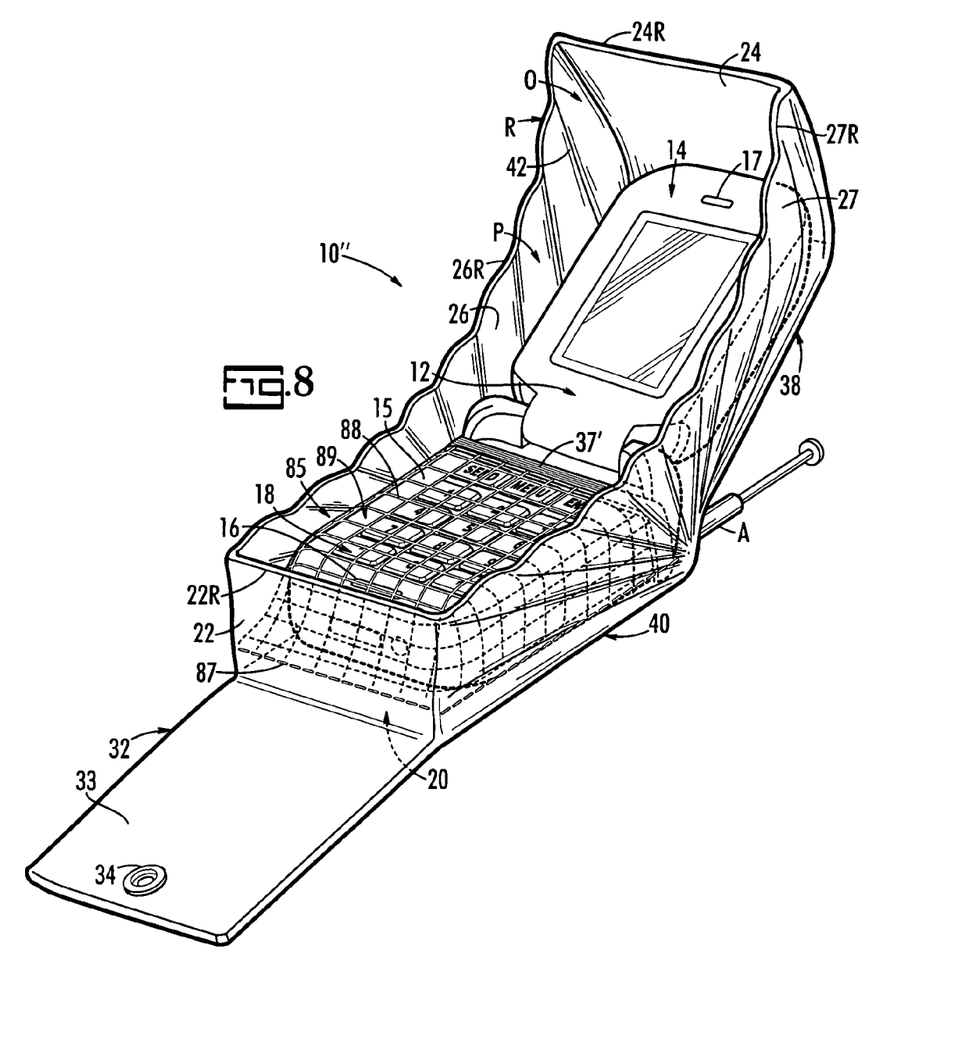
FIG. 8 is a perspective front view illustrating another embodiment of a phone carrying case according to the invention in its open condition for use with a flip-top phone as nested therein.

As shown in FIG. 8, an open mesh net 85 may be provided in place of the strap 37 between the mouth end wall 22 and lower portions of sidewalls 26 and 27 of the case 10 of FIG. 1 to produce a modified case 10" having an auxiliary interior pocket as the means for retaining the phone 12 in the main pocket P' with the microphone end adjacent the mouth end wall 22 and the speaker end adjacent the ear end wall 24, the same numerical designations being used for identical elements in both figures. Alternatively, the net 85 may be attached to corresponding portions of the bottom wall 20. The net fabric, which is flexible and may also be elastic, is made up of crisscrossed threads 88 defining a plurality of openings 89 and, because of its flexibility and/or elasticity does not interfere with accurately pushing the keys of the keypad 18, which is easily viewed through the mesh openings. It is further contemplated that the size and arrangement of the mesh openings may be such that the threads 88 fit between the keys of the keypad and are held in position by their elasticity.

The open mesh net 85 may be attached to the bottom wall 20, or to the sidewalls 26 and 27 and end wall 22, by stitching 87 to form the auxiliary interior pocket, which is dimensioned to fit around and receive therein the base 13 of phone 12. This interior pocket has an entrance opening facing away from the mouth end wall 22 of the case 10" and this opening preferably has on at least one side, more preferably on at least three sides, an elastic band 37' for gripping the phone 12 above its keypad 18 after insertion of the base 13 of the phone body into the pocket. Netting similar to net 85 also may be used as the phone retaining means for the case 50 of FIGS. 5-7 in place of or in combination with the strap 77. As a further alternative, an interior pocket (not shown) having open mesh netting extending from the ear end wall 24 or 64 and an elastic banded opening facing toward the mouth end wall 22 or 62 could receive and hold in position at least an upper part of the flip-top phone 12 or the rigid body phone 52.

Referring now to FIGS. 5-7, there is shown as another embodiment a cell phone carrying case 50 that, when in its open position as shown in FIG. 5, is capable of covering both the mouth M' and the ear E' and forming a seal with the face F' of a cell phone user H' as shown in FIG. 7. The structure of this case is also such that the voice of the user is sufficiently muffled and blocked beyond the case to the make his or her cell phone conversation unintelligible to other persons in the vicinity, at least when the user is speaking in a normal voice.

In FIG. 9, there is shown a phone case 50' comprising the pocket P' previously described in connection with FIGS. 5-7 and in which is nested the rigid phone body 53' of a receiver 52' of a corded phone having a separate base (not shown) to which the receiver is connected by a phone cord 90 that passes through an aperture 92 in a modified mouth end wall 62', the same numerical designations being used for identical elements in FIG. 9 as in FIG. 5. As an alternative, an aperture for the cord 90 may be located in the bottom wall 60 or in either of the sidewalls 66 or 67. The ridged phone body 53' has an exposed face 55' with a microphone 56' near one end and a speaker 57' near the opposite end thereof.

Because the receiver body 53' is longer than the body 53 of cell phone 52, it fills more of the volume of the pocket P' and the case 50' does not have a foldable upper section corresponding to the upper section 78 shown in FIGS. 5 and 6. The closure tab and snap securing elements of case 50 are also omitted from case 50'. A keypad of the usual type is located on the separate phone base that is not shown. It therefore follows that the cases and privacy features of the invention can be used with the hinged and rigid bodies of cell phones, the rigid bodies of cordless phones and the separate rigid receiver bodies of corded phones, and that, for purposes of this disclosure and the claims set forth below, the term "phone body" encompasses at least all of these types of bodies.

Figures 10, 11, 12:
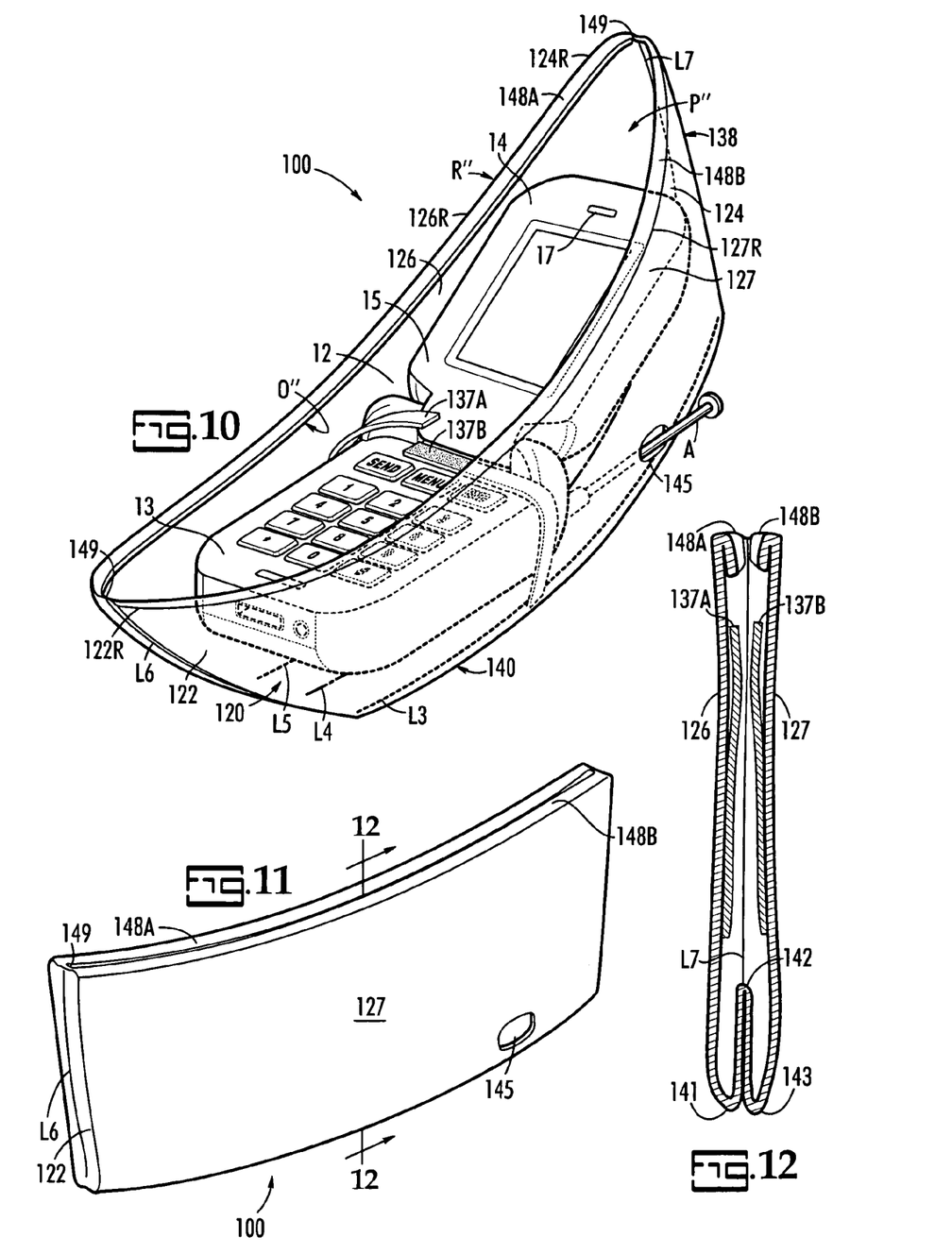
FIG. 10 is a perspective side view illustrating still another embodiment of a phone case according to the invention in its open condition for use with a flip-top cell phone as nested therein.
FIG. 11 is a perspective front view of the case of FIG. 10 in its collapsed condition for storage of the case after removal of the phone therefrom.
FIG. 12 is a sectional view of the case of FIG. 11 as taken along the section line 12-12 in FIG. 11.

Referring now to FIGS. 10-14, there is shown as a further embodiment a collapsible phone case 100 that, when in its open position as shown in FIG. 10, is capable of covering both the mouth and the ear and forming a seal with the face of a human user in a manner similar to the embodiments of FIGS. 4 and 7. The structure of this case is also such that the voice of the user is sufficiently muffled and/or blocked beyond the case to the make his or her cell phone conversation unintelligible to other persons in the vicinity, at least when the user is speaking in a normal voice.

The phone case 100 is shown being used with the body of the cellular phone 12 previously described in reference to FIG. 1. The phone body here also may be of the rigid type shown in FIG. 5. The carrying case 100 comprises a pocket P''' in which the phone is nested. The pocket P''' is formed by a bottom wall 120 having three fold lines L3, L4 and L5, upstanding sidewalls 126 and 127 on opposite sides of the bottom wall, an upstanding mouth end wall 122 having a fold line L6, and an upstanding ear end wall 124 having a fold line L7 opposite the fold line L6, each of the upstanding walls being connected at its base to the bottom wall 120.

Figures 13, 14, 15:
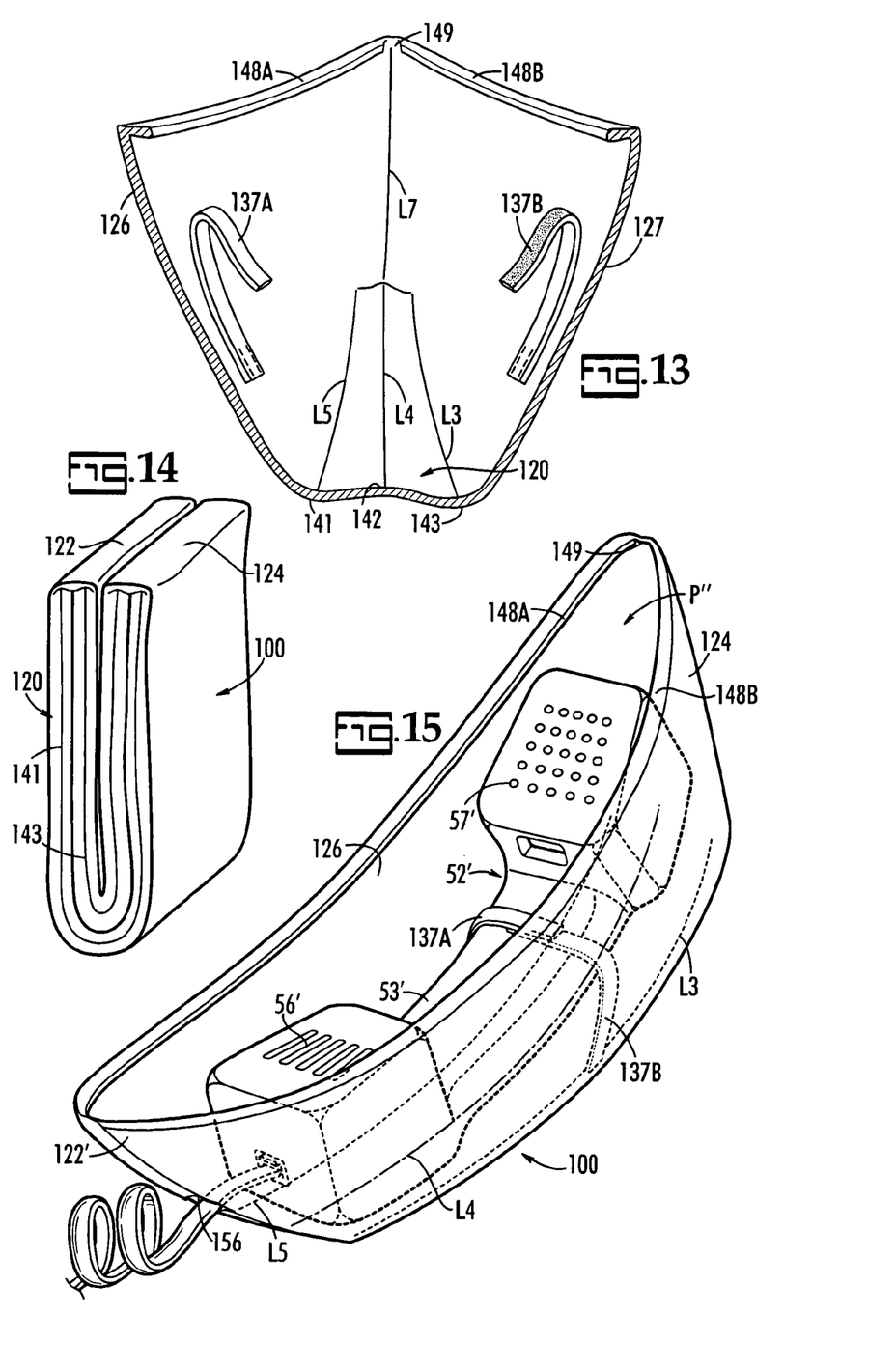

All of the walls of case 100 are made of a flexible, sound absorbing material. Because the mouth end wall 122, the ear end wall 124 and the bottom wall 120 each comprise at least one fold line, this flexible case is collapsible along these fold lines from the open condition for receiving the phone body 13, 14, as shown in FIG. 10, to a collapsed condition in which the opposing sidewalls 126 and 127 may be brought into abutment upon removal of the phone body, as illustrated in FIG. 11. As the case 100 collapses, the three fold lines L3, L4 and L5 in bottom wall 120 form corresponding accordion-like pleats 141, 142 and 143 as may be seen best in FIG. 12. When the case is opened from its collapsed condition to receive a phone, these pleats flatten out to form the bottom wall 120 as illustrated best in FIG. 13. More than three such pleats may be provided if a bottom wall of greater width is desired. In its collapsed condition, the case 100 may be folded over double into a compact shape as shown in FIG. 14, which is easily transported in a pocket or purse.

The mouth end wall 122 and the ear end wall 124 are connected to the bottom wall 120 at the base of their respective fold lines L6 and L7 and these walls extend toward their respective fold lines from just beyond the corresponding ends of the phone body in its position for use, which is the open position for flip-top phone 12. Sidewalls 126 and 127 are connected to the bottom wall 120 along its corresponding edges that extend along the sides of the open and nested phone body 13, 14. The ear end wall 124 may have an aperture 145 through which the phone antenna A may be extended when the phone is in use.

The sidewalls 126 and 127 and end walls 122 and 124 also extend away from the bottom wall 120 to form a pocket opening O''' with a substantially continuous edge or rim R''' comprised of sidewall edges 126R and 127R and end wall edges 122R and 124R. When the phone is in use, the rim R''' is substantially beyond the phone face 15 and extends from ear to mouth and around the mouth of a phone user such that, when the case 100 is held in the user's hand with the opening O''' toward the user's face, the upper case portion 138 opposite the ear, and the lower case portion 140 opposite the mouth, the mouth is hidden from view and the walls of the case form a sound barrier similar to the previous illustrations of the cases in FIGS. 4 and 7.

Thus, the structure of the pocket P''' and its opening O''' are such that words spoken in a normal voice by a user of the phone are received by the microphone while being muffled and/or blocked beyond the case sufficiently to be substantially unintelligible to persons in the vicinity of the user. To increase the effectiveness of this sound barrier, the edges 126R and 127R of opening O''' preferably vary in their height above bottom wall 120 to provide the rim R''' with a curved shape conforming generally to the contour of a human face from ear to mouth, and the rim R''' preferably includes an inwardly projecting lip as shown in FIG. 10. The lip is preferably formed as two opposing segments 148A and 148B, the opposite ends of which are separated by gaps 149, 149 as shown in FIG. 10 so that these lip segments are easily foldable downward as may be seen best in FIG. 12. The inwardly projecting lip segments 148A and 148B preferably form part of the rim R''', at least along the portions thereof extending from ear to mouth, to provide a smooth surface for comfortably contacting the user's face and facilitating the substantial sound seal provided by this rim.

Because all of the walls of case 100 are made of a flexible material, the rim R''' of the opening O''' is sufficiently deformable to conform substantially to the ear to mouth contour and form a substantial sound seal when pressed against a variety of human faces. In addition, the ear end wall 124 preferably also extends from the bottom wall 120 to beyond the phone face 15 to form an ear portion 124R along the rim of the case opening O''' that is adapted to be placed over and/or behind the rear lobe of the phone user's ear to muffle and/or block external noise that would otherwise interfere with phone user's hearing of words emitted by the phone's speaker 17. A length of the case 100 in the range of about six to twelve inches, preferably about seven to ten inches, will usually be sufficient for an open case to extend both over the mouth and the ear. The width of the central portion of the case 100 when unfolded for receiving the phone body is sufficient for the pocket P''' to receive the width of conventional phone bodies, which usually will require a width in the range of one and a half to four inches.

The collapsible case of FIGS. 10-14 is also usable with the receiver 52' of a corded phone having a separate base (not shown) to which the receiver is connected by the phone cord 90 that passes through an aperture 156 in a modified mouth end wall 122' as shown in FIG. 15, the same numerical designations being used for identical elements in FIG. 15 as in FIGS. 9 and 10. In FIG. 15, there is shown a phone case 100' comprising the pocket P''' previously described in connection with FIGS. 10-14 and in which is nested the rigid phone receiver body 53'. An aperture (not shown) for the cord 90 may also be located in the bottom wall 120 or in either of the sidewalls 126 or 127. As described in connection with FIG. 9, the ridged receiver body 53' has an exposed face with a microphone 56' near one end and a speaker 57' near the opposite end thereof.

A retaining strap comprising opposing segments 137A and 137B may optionally be provide intermediate the ends of the bottom wall 120 as a means for retaining the phone 12 in the pocket P''' with the microphone end adjacent the mouth end wall 122 and the speaker end adjacent the ear end wall 124. The two segments 137A and 137B have end portions that may be overlapped and detachably connected by hook and loop fastening elements or by other detachable fastening elements as shown in FIGS. 10 and 15. These straps and fastening elements also may be the same as previously described in connection with FIGS. 1, 2, 5 and 9. The strap segments 137A and 137B are connected at their opposite ends to the respective sidewalls 126 and 127. When attached together, these strap segments are arranged to pass over and engage an intermediate portion of the phone face 15 to hold the phone 12 in a secure position against an interior surface of the bottom wall 120. For the flip-top phone 12, the strap segments 137A and 137B are preferably made of two pieces of thin elastic material so as not to interfere with closure of the flip top 14 against the base 13. When case 100 is collapsed, these strap segments may be folded upward as illustrated in FIGS. 12 and 13.

The cases of the invention in their condition for use of the nested phone or receiver are capable of muffling and blocking beyond the case the user's voice sufficiently to the make a phone conversation unintelligible to other persons in the vicinity, at least when the user is speaking in a normal voice. For purposes of this disclosure, "in the vicinity" of the user does not include persons in the presence of the user, i.e., persons with or otherwise very close to the user, but starts after a short distance of about five feet, preferably about four feet, and more preferably about three feet from the user. Another measure of the effectiveness of the phone case to muffle and/or block noise beyond the case is that, at a distance therefrom of about three (3) feet, the volume level of a person speaking into the microphone of phone nested therein is reduced substantially, preferably by at least 50%, more preferably by at least 60%, and most preferably by at least 70%. When, as preferable, the rim extends over and behind the rear ear lobe, external noise (voices and other sounds) is also reduced substantially, preferably by at least 50%, more preferably by at least 60%, and most preferably by at least 70%.

While specific case structures for specific phones have been described and illustrated in detail by way of example, it will be apparent to those skilled in the art that many modifications and variations in these structures and their adaptation to other phone designs are possible without deviating from the broad scope of the present invention. For example, the cases may be made from many different materials, both flexible, semi-ridge and ridged, and from combinations of materials such as a ridge material for the bottom wall and flexible material(s) for the side and end walls. Folding of the bottom wall, particularly if it is rigid or semi-rigid, may be facilitated by hinges such as employed in flip-top cell phones. In addition, many other securing means and fastening means may be substituted for those specifically described above. The walls of the cases and the closure flaps or tabs may have a wide variety of shapes and sizes. Thus, the specific embodiments described herein are for the purpose of illustrating the present invention, and persons skilled in the art will recognize variations thereof that fall within the scope of this invention, which is limited only by the claims appended hereto, and the equivalence of the features described therein.

What is claimed is:

1. A phone case for a phone body having when in use a face with a microphone near one end of the phone body and a speaker near another end of the phone body, said case comprising a pocket having a bottom wall, opposing side walls, and a mouth end wall connected to said bottom and side walls beyond the microphone end of the phone body when nested in said pocket;

wherein said sidewalls extend along corresponding sides of the phone body from beyond the microphone end thereof to beyond the speaker end thereof;

wherein said side and end walls extend away from said bottom wall to form a pocket opening with a rim extending around the mouth such that the mouth is hidden from view and words spoken in a normal voice by a user of the phone body are received by the microphone while being muffled and blocked beyond the case sufficiently to be substantially unintelligible to persons in the vicinity of the user;

wherein portions of said rim on opposite sides of said pocket opening are adapted to provide a curved shape conforming generally to the contour of a human face from an ear to a mouth;

and wherein a portion of said rim along each of said sidewalls comprises a projecting lip of flexible material that provides a smooth surface for comfortably contacting the user's face and a substantial sound seal with the user's face.

2. A phone case according to claim 1, wherein said rim portions are made of a flexible, sound absorbing material, and are sufficiently deformable to conform substantially to said face contour and form a substantial sound seal when pressed against a human face.

3. A phone case according to claim 1 further comprising an ear end wall connected to said bottom and side walls beyond the speaker end of the phone body when nested in said pocket, said ear end wall extending from said bottom wall to beyond the phone face to form an ear portion of said rim that is adapted to be placed behind an ear lobe to reduce external noise that would otherwise interfere with the phone user's hearing of words emitted by the phone's speaker, and wherein said rim extends substantially continuously around the perimeter of said pocket opening.

4. A phone case according to claim 1 further comprising means for retaining the phone body in said pocket with its microphone end adjacent said mouth end wall.

5. A phone case according to claim 4, wherein said retaining means is a strap connected at opposite ends to said bottom wall or to said sidewalls and arranged to pass over and engage an intermediate portion of said phone face to hold said phone body in a secure position against an interior surface of said bottom wall, and wherein said strap is made of an elastic material.

6. A phone case according to claim 4, wherein said retaining means is a strap connected at opposite ends to said bottom wall or to said sidewalls and arranged to pass over and engage an intermediate portion of said phone face to hold said phone body in a secure position against an interior surface of said bottom wall, and wherein said strap comprises a first segment arranged to overlap and detachably engage a second segment, and wherein said overlapped segments are detachably engaged by fastening elements.

7. A phone case according to claim 4, wherein said retaining means is an open mesh net attached to the bottom wall or sidewalls to form an auxiliary interior pocket for receiving at least part of the phone body through an entrance opening.

8. A phone case according to claim 7, wherein said entrance opening comprises an elastic band arranged to pass over and engage an intermediate portion of the phone face to hold the phone body in a secure position against an interior surface of said bottom wall.

9. A phone case according to claim 7, wherein said entrance opening faces away from said mouth end wall and said pocket is arranged to receive and hold a base part of the phone body.

10. A phone case according to claim 9, wherein the phone face includes a keypad and said entrance opening comprises an elastic band for gripping the phone face above its keypad.

11. A phone case according to claim 1 for carrying a cellular phone body, wherein an upper portion of the phone case is adapted to be folded over a lower portion thereof to close the pocket opening, and wherein the case further comprises connecting means for detachably connecting said upper portion to said lower portion to keep said pocket closed.

12. A phone case according to claim 11, wherein each of said sidewalls has accordion-like pleats to facilitate the folding of said upper portion over said lower portion to close the pocket opening.

13. A phone case according to claim 11, wherein a portion of said rim along each of said sidewalls comprises an inwardly projecting lip to facilitate the folding of said upper portion over said lower portion to close the pocket opening.

14. A phone case according to claim 11, wherein said connecting means comprises a flap connected to the bottom wall and means for detachably fastening said flap to an exterior surface of the case to keep the opening closed.

15. A phone case according to claim 14, wherein said fastening means comprises a mechanical fastener arranged to detachable connect said flap to an exterior surface of said case.

16. A phone case according to claim 15, wherein said mechanical fastener comprises a male snap element and a female snap element, one of which is on an interior surface of said flap and the other on said exterior case surface.

17. A phone case according to claim 15, wherein said mechanical fastener comprises a hook fastening element and a loop fastening element, one of which is on an interior surface of said flap and the other on said exterior case surface.

18. A phone case according to claim 1, wherein said side and end walls are made of a sound absorbing material to facilitate the muffling and blocking of the user's words beyond the case.

19. A phone case according to claim 1 for a receiver phone body of a corded phone, wherein the case further comprises an aperture in a wall of the case through which a cord may pass to connect the receiver body to a base of the corded phone.

20. A phone case according to claim 1, wherein said case walls are made of a flexible material, wherein the mouth end wall comprises a fold line, and wherein the bottom wall comprises at least one fold line such that the case is collapsible along said fold lines from an open condition for receiving a phone body to a collapsed condition in which said opposing sidewalls may be brought into abutment upon removal of the phone body.

21. A phone case according to claim 20, wherein said bottom wall comprises at least three fold lines for forming at least one pleat when said case is in its collapsed condition.

22. A phone case for a phone body having when in use a face with a microphone near one end of the phone body and a speaker near another end of the phone body, said case comprising a pocket having a bottom wall, opposing sidewalls, a mouth end portion connected to said bottom and side walls beyond the microphone end of the phone body when nested in said pocket, and an ear end portion connected to said bottom and side walls beyond the speaker end of the phone body when nested in said pocket;

wherein said sidewalls extend along corresponding sides of the phone body from beyond the microphone end thereof to beyond the speaker end thereof;

wherein said sidewalls and said mouth end portion extend away from said bottom wall to form a pocket opening with a rim extending around the mouth such that the mouth is hidden from view and words spoken in a normal voice by a user of the phone body are received by the microphone while being muffled and blocked beyond the case sufficiently to be substantially unintelligible to persons in the vicinity of the user;

wherein said case is made of a flexible material, and said mouth end portion and said ear end portion each comprise a fold line;

and wherein the bottom wall comprises at least one fold line, said wall and end portion fold lines being arranged to cooperate such that the case is collapsible along said fold lines from an open condition for receiving the phone body to a collapsed condition in which said opposing sidewalls may be brought into abutment upon removal of the phone body.

23. A phone case according to claim 22, wherein said bottom wall comprises at least three fold lines for forming at least one pleat when said case is in its collapsed condition.

24. A phone case according to claim 22, wherein said ear end portion extends from said bottom wall to beyond the phone face to form an ear portion of said rim that is adapted to be placed behind an ear lobe to reduce external noise that would otherwise interfere with the phone user's hearing of words emitted by the phone's speaker.

25. A phone case according to claim 22, wherein a portion of said rim along each of said sidewalls comprises a projecting lip of flexible material that provides a smooth surface for comfortably contacting the user's face and a substantial sound seal with the user's face.

26. A phone case according to claim 22, wherein said rim portions have a curved contour conforming generally to the contour of a human face from an ear to a mouth.

27. A phone case for a phone body having when in use a face with a microphone near one end of the phone body and a speaker near another end of the phone body, said case comprising a pocket having a bottom wall, opposing side walls, a mouth end wall connected to said bottom and side walls beyond the microphone end of the phone body when nested in said pocket, and an ear end wall connected to said bottom and side walls beyond the speaker end of the phone body when nested in said pocket;

wherein said sidewalls extend along corresponding sides of the phone body from beyond the microphone end thereof to beyond the speaker end thereof;

wherein said side and end walls extend away from said bottom wall to form a pocket opening with a rim extending around the mouth such that the mouth is hidden from view and words spoken in a normal voice by a user of the phone body are received by the microphone while being muffled and blocked beyond the case sufficiently to be substantially unintelligible to persons in the vicinity of the user;

wherein portions of said rim on opposite sides of said pocket opening are adapted to provide a curved shape conforming generally to the contour of a human face from an ear to a mouth;

and wherein the mouth end wall and the ear end wall each comprise a fold line, and wherein the bottom wall comprises at least one fold line such that the case is collapsible along said fold lines from an open condition for receiving a phone body to a collapsed condition in which said opposing sidewalls may be brought into abutment upon removal of the phone body.

28. A phone case according to claim 27, wherein said bottom wall comprises at least three fold lines for forming at least one pleat when said case is in its collapsed condition.

29. A phone case according to claim 27, wherein said rim portions have a curved contour conforming generally to the contour of a human face from an ear to a mouth.

* * * * *